(12) United States Patent
Telefus et al.

(10) Patent No.: US 6,304,473 B1
(45) Date of Patent: Oct. 16, 2001

(54) OPERATING A POWER CONVERTER AT OPTIMAL EFFICIENCY

(75) Inventors: Mark D. Telefus, Orinda; Dickson T. Wong, Burlingame; Charles R. Geber, Woodside, all of CA (US)

(73) Assignee: Iwatt, Campell, CA (US)

( * ) Notice: Subject to any disclaimer, the term of this patent is extended or adjusted under 35 U.S.C. 154(b) by 0 days.

(21) Appl. No.: 09/679,949

(22) Filed: Oct. 4, 2000

Related U.S. Application Data

(63) Continuation-in-part of application No. 09/585,928, filed on Jun. 2, 2000.

(51) Int. Cl.[7] .......................... H02M 3/156; H02M 3/335
(52) U.S. Cl. ................... 363/97; 363/21.04; 363/21.12; 323/222; 323/282
(58) Field of Search .......................... 323/222, 282, 323/284, 285; 363/20, 21.01, 21.04, 21.12, 970

(56) References Cited

U.S. PATENT DOCUMENTS

| | | | |
|---|---|---|---|
| 4,589,051 | * 5/1986 | Santurtun et al. | 363/88 |
| 4,597,026 | * 6/1986 | Santurtun et al. | 363/88 |
| 6,181,583 | * 1/2001 | Okui et al. | 363/89 |
| 6,208,528 | * 3/2001 | Soto et al. | 363/89 |

* cited by examiner

*Primary Examiner*—Jeffrey Sterrett
(74) *Attorney, Agent, or Firm*—Lyon & Lyon LLP

(57) ABSTRACT

A power converter control system is provided which combines a pulse train regulation control technique with a pulse train optimization technique, to control the output level of the power converter, while maintaining optimal performance for other power converter parameters. The power converter control system describe herein provides versatility not previously available in power converter control systems by providing features such as quasi-resonant mode control, discontinuous mode control, and/or power factor correction. A pulse optimizer adjusts or customizes, for example, the ON time, duty cycle or frequency of pulse train pulses output by a pulse generator. The adjusted pulses are gated by a pulse rate controller to selectively actuate a power switch, thereby regulating the output power level and optimize the overall performance of the power converter.

25 Claims, 8 Drawing Sheets

PULSE TRAIN REGULATION w/ PULSE TRAIN OPTIMIZATION

OPERATING A POWER CONVERTER AT OPTIMAL EFFICIENCY

RELATED APPLICATION DATA

This application is a continuation in part of U.S. patent application Ser. No. 09/585,928, filed Jun. 2, 2000, the disclosure of which is fully incorporated herein by reference.

FIELD OF THE INVENTION

This invention pertains generally to the field of power conversion and more particularly to a power supply control systems.

BACKGROUND OF THE INVENTION

Compact and efficient power supplies are an increasing concern to users and manufacturers of electronics. Pulse width modulated (PWM) switching power supplies offer both compactness and efficiency in a number of different topologies which can be placed in two main categories: isolated switching power supplies and non-isolated switching power supplies. In a non-isolated switching power supply, such as a buck (reducing voltage) or boost (increasing voltage) switching power supply, the power output is not isolated from the power input. Isolated power supplies, such as a flyback or forward switching power supplies, have a power output that is isolated from the power input through a transformer.

In either type of power converter, however, typical control systems use a pulse-width-modulator to control the duty cycle of the power switch(es) within the converter. Consider, for example, the flyback switching power supply of FIG. 1. The power converter includes a power switch Q1 (typically a field effect transistor (FET)) coupled to the primary of a power transformer T1 and a diode D1 and capacitor C1 coupled to the secondary of the power transformer T1. The control system for controlling the power converter includes a PWM controller 105 to provide the signal to turn on switch Q1 and a feedback circuit 110 coupled to the PWM controller 105. The feedback circuit 110 receives an output power level sense circuit that varies in time with changes in the output power level. An oscillator (not shown) included in the PWM controller 105 sets the operating frequency while a pulse-width modulator adjusts the duty cycle of the power switch Q1 at the set operating frequency in response to sensing, for example, an output voltage, Vout. The frequency of the oscillator is relatively low, in the range of 50 KHz. The relationship between the input voltage, $V_{in}$, and $V_{out}$ for the flyback converter illustrated in FIG. 1 may be approximated as $$V_O = (V_{IN} * N_S / N_P) * D / (1-D); \text{ and}$$

$$D = (T - t_{off}) / T; \text{ and}$$

$N_P$—number of turns on the primary winding $N_S$—number of turns on the secondary winding where 'D' is duty cycle, T is the switching period, and $t_{off}$ is the off time of the power switch Q1.

Thus, in the flyback converter of FIG. 1, the off time, $t_{off}$ (and hence also the on time, $t_{on}$) of the power switch Q1 defines a power cycle, or power pulse, which is reflected in the value of $V_{out}$ through the above equation. Similarly, the output voltage of a forward power converter can be determined using the equation:

$$V_O = (V_{IN} * N_S / N_P) * D$$

In any case, the power pulse is thus a regulated power pulse because its characteristics have a direct relationship on the output voltage. This relationship between the characteristics of a single power cycle (or pulse) and the output voltage is generic to prior art PWM switching power supplies, regardless of whether the PWM switching power supply is direct coupled or transformer coupled. Thus, a single power cycle (or pulse) in these prior art PWM switching power supplies may be denoted as an "intelligent" power cycle or pulse because of its effect on the output voltage.

FIG. 2 provides another example of a prior art PWM based power converter control system. In this case, the power converter is illustrated generally as the power stage 205 including a switching transistor Q1. The control system is indicated as controller 210 including the PWM controller 105 and feedback circuit 110. The feedback signal line is shown in this case to be a current sense on the output of power transistor Q1 and a connection to Vout of the power converter input to a summing circuit 215. As illustrated, this power converter PWM based control system may be used with any converter topology, whether isolated or non-isolated power converter configuration.

With this control system approach, the pulse widths of the pulses vary widely as input line voltage and output load conditions vary. Optimum system performance is achieved only at a single operating point (line and load condition), where the power pulse width and/or pulse frequency is well matched to the particular power conversion stage. Furthermore, because power pulses are closely coupled to output regulation, optimization over a wide operating range with only PWM control is difficult to achieve without degrading output regulation performance. Thus, there is a need in the art of power converters for a more versatile control system approach that can maintain optimal power converter performance and maintain high efficiency over a broad range of load and line conditions.

SUMMARY OF THE INVENTION

In accordance with a general aspect of the present invention, a power converter control system is provided, which combines a constant frequency, constant duty cycle switched mode control system, hereinafter referred to generally as pulse train regulation, described in detail in related U.S. patent application Ser. No. 09/585,928, with a preferred optimization techniques in order to control the output level of the power converter, while maintaining optimal performance for other power converter parameters. By way of non-limiting examples, a preferred power converter control system according to the present invention includes features such as quasi-resonant mode control, discontinuous mode control, and/or power factor correction.

Pulse train regulation is a control technique that makes it possible to control the output value (e.g., output voltage) of a switching power converter by controlling the rate of constant frequency, constant duty cycle switching pulses. In a preferred embodiment, the pulse train regulation is provided by a pulse rate controller, which regulates the number of pulses of power appearing over time at the output of the power converter by controlling the number of pulses of a continuous pulse train output from a pulse generator for activating a power switch. The continuous pulse train of the pulse generator preferably operates at a high frequency, for example, 1 MHz. The pulse rate controller may control the number of pulses of the pulse train that occur at the power switch by using a gating function implemented with, for example, an AND gate. The pulse rate controller determines the rate of pulses that are sent to the power switch based on output level (e.g., voltage) conditions. The number of pulses that reach the power switch will vary over line and load conditions as determined by the pulse rate controller. Unlike a PWM control technique, power pulse duty cycle and frequency as generated by the pulse generator of the pulse train control system are uncoupled from the output level conditions and are gated to maintain a desired output power level (e.g., voltage).

In accordance with the present invention, pulse train optimization provides further control techniques, which adjust, for example, the turn on time, and/or frequency of the pulses in the pulse train to optimize the performance of the power converter. In a preferred embodiment, a pulse train regulation control system includes a control system having a pulse optimizer to adjust the characteristics of the pulses output from a pulse generator. In this manner, pulse train pulses from the pulse generator are preconditioned in order to achieve optimum power supply performance, while the pulse rate controller still maintains output regulation by controlling which of the preconditioned pulses from the pulse train are sent to the power stage.

One example of a control system with pulse train optimization provides quasi-resonant operation. Resonant and quasi-resonant power converter operation improves operational efficiency, system reliability, and reduces EMI emissions of the power converter. The lower the voltage across the power switch at the time it is turned on, the better the performance of the power converter. The closer the switching on of the power switch is to the point in time when there is zero voltage across the power switch, the more closely quasi-resonant operation will be achieved. The pulse optimizer is capable of providing discontinuous mode of operation and ensuring quasi-resonant mode of conversion throughout all line and load conditions. Operating at or near quasi-resonance will increase operational efficiency by reducing switching losses, reduce EMI emissions by eliminating high voltage/high current switching, and improve the system reliability by reducing component stress. Quasi-resonant operation can be ensured if the power switch is turned on at a zero voltage switching point.

Zero voltage switching (ZVS) for power MOSFET switch (es) and for power transformer magnetic flux is described as a condition when optimizing the time to trigger a next power pulse to be coincident with a zero crossing point of the inductor. This mode of operation may thus be known as a quasi-resonant mode. To ensure quasi-resonant mode operation of the power converter, the pulse optimizer may be configured to allow pulses of the pulse train output by the pulse generator to switch the power switch from OFF to ON, only when voltage across the inductor is approximately equal to zero. At this point, the magnetic flux in the inductor is fully reset. In one preferred embodiment, an optimized power converter control system is provided for controlling a switching power supply having one or more power switches for producing pulses of power at an output of the switching power supply. The control system, which controls the ON and OFF cycle of the power switch(es), includes: (1) a pulse rate controller which provides output level regulation of the power converter by controlling the rate of pulses sent to the power switch(es) over time; (2) a pulse generator which produces a stream of power pulses (called pulse train), (3) a gate, for example and AND gate, that gates pulses from the pulse generator to the power switch, based on input from the pulse rate controller, and (4) a pulse optimizer which controls the characteristics of the power pulses output by the pulse generator, resulting in optimized operation. This power converter control system may be a controller, including a digital controller.

In the case of "zero voltage switching" (ZVS), the pulse optimizer is constructed to ensure that the power switch(es) transition from the "off" to "on" state when the voltage across the primary winding is approximately equal to zero volts, thus insuring that the current through the power switch(es) at turn-on is approximately zero. In one embodiment, the pulse optimizer provides quasi-resonant mode conversion with zero voltage switching of the primary winding by continuously sampling of the primary winding voltage waveforms and generating an estimation of residual energy in the power transformer core after fully delivering energy to the load. By sensing and sampling the primary winding voltage, for example the MOSFET drain voltage waveform less the input voltage, the power switch can be switched to the "on" state when the voltage across the primary winding of the transformer is approximately (sufficiently, substantially, etc.) equal to 0 volts. The zero voltage turn on of the power switch will optimize the operational efficiency by reducing switching losses, reduce EMI emissions by eliminating high voltage/high current switching, and improve the system reliability by reducing component stress.

In another embodiment, the power converter and control system includes a power switch actuated by the output of a gate. The gate has one input from a pulse rate controller and another input from a pulse generator. The pulse rate controller has input from a feedback circuit that is coupled to the power converter and/or the power switch. The pulse generator receives an input from a pulse optimizer. The pulse optimizer is coupled to the power switch and/or the power converter. In operation, the pulse optimizer monitors one or more characteristics and/or parameters of the power converter and/or power switch so as to adjust or customize high frequency output pulses in the pulse train output by the pulse generator. These adjustments help improve the performance characteristics of the power converter. The output power of the power converter is controlled by the pulse rate controller and the feedback circuit. The pulse rate controller either enables or disables the various optimized pulses in the pulse train to turn the power switch on and off, based on the feedback information delivered by the feedback circuit that monitors the power converter output power level. Thus, the pulse rate controller, feedback circuit, gate, and pulse generator work in conjunction to regulate the power output level of the power converter and the pulse optimizer in conjunction with the pulse generator to regulate other performance characteristics of the power converter. Quasi resonant operation is an example of this cooperation.

In a still further preferred embodiment, the pulse optimizer may include a voltage sense for sensing the voltage at the power input of the power switch, a sample and hold for sampling the voltage at the power input to the power switch, and/or a zero voltage detector for determining when the voltage across the power inductor is at zero volts. The pulse optimizer may be implemented using analog and/or digital circuitry and may include various logic circuits and/or a microprocessor for determining and triggering at the optimum time for the next pulse based on a power switch power input (e.g., the drain voltage of a power MOSFET).

In preferred embodiment, each component of the control system may be included within the same controller and/or microprocessor.

In preferred embodiments, the control system senses power stage (i.e., power converter including a power switch)

parameters. The power stage parameters may be directly or indirectly sensed. The high frequency pulse train provides a means for increasing the overall power converter efficiency by, for example, using the same frequency so that various circuit components (e.g., power transistors, power MOSFET (s), rectifier diode's, transformer's, inductor's, capacitor's, etc.) may be selected to operate with the least amount of loss at the particular frequency and/or frequency range selected for the high frequency pulse train operation. Further, the circuit elements of the power converter may be selected with less exacting electrical characteristics.

Those skilled in the art will understand that the control system of the present invention may implemented with analog and/or digital circuitry which may include various logic circuits and/or a microprocessor along with appropriate software or firmware to achieve the desired feature/functions for optimum power converter operation. Further, those skilled in the art will understand that the control system of the present invention may operate with any power controller topology to achieve optimum operation.

The following description and figures disclose other aspects and advantages of the present invention.

BRIEF DESCRIPTION OF THE DRAWINGS

The various aspects and features of the present invention may be better understood by examining the following figures, in which.

DESCRIPTION OF THE PREFERRED EMBODIMENTS

Figure 3:
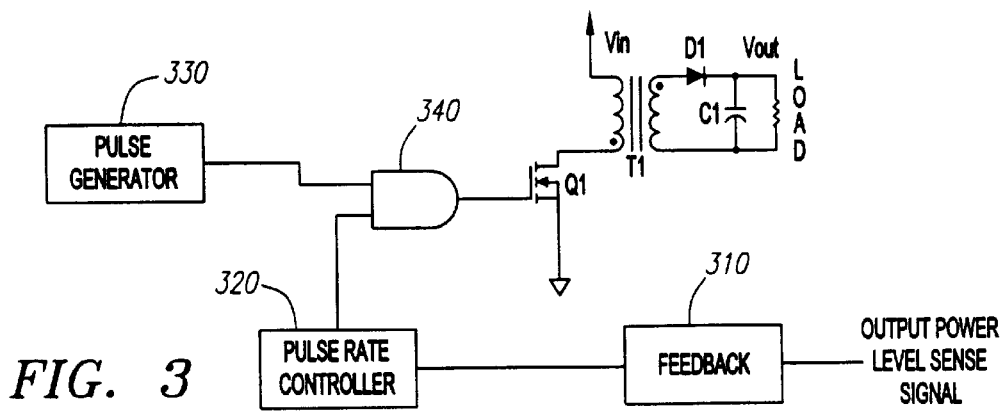
FIG. 3 is a schematic illustrating a pulse train control system coupled to a flyback power converter.

Referring to FIG. 3, a typical pulse train control system coupled to a flyback power converter is provided. The pulse train control system may include, for example, a pulse generator 330 for generating a pulse train that will actuate the power switch, in this example a power MOSFET Q1. The power switch may include more than one transistor and be considered part of the control system or part of the power converter. A pulse train output of the pulse generator 330 is coupled to a gate 340 and is gated by the output of a pulse rate controller 320 that is also coupled to the gate. Although the gate 340 is illustrated as an AND gate, it may be any type of gate and may include one or more logic gates. Further, the control system may include a feedback circuit 310 that provides feedback of the output power level (e.g., voltage, current, etc.) to the pulse rate controller 320. The flyback power converter may include, for example, the transformer T1 whose primary winding is coupled to a power source Vin and the power switch Q1. The transformer Q1 secondary may be coupled to a diode D1 and capacitor C1 and be connected to a load 350. Although the load 350 is depicted as a resistor, in practice the load may include inductive and capacitive elements and may have variable load characteristics. In operation, the pulse train regulation may be provided by pulse rate controller 320 controlling the number of pulses of power appearing at the output of the power converter (i.e., at the load 350) over time by controlling the number of pulses of a pulse train output from a pulse generator 330 that will activate a power switch Q1. The pulse train output by the pulse generator 330 typically operates at a high frequency, for example, 1 MHz. Further, the pulse generator 330 in this control system will typically be an oscillator with a constant frequency and constant duty cycle, which are not dynamically changed. The pulse rate controller 320 may then control the number of pulses of the pulse train that occur at the power switch Q1 by using a gating function implemented with, for example, the AND gate 340. In particular, the pulse rate controller 320 determines the rate (number) of pulses, and which pulses, sent to the power switch Q1, based on input line and output load (e.g., voltage) conditions.

Figure 4:
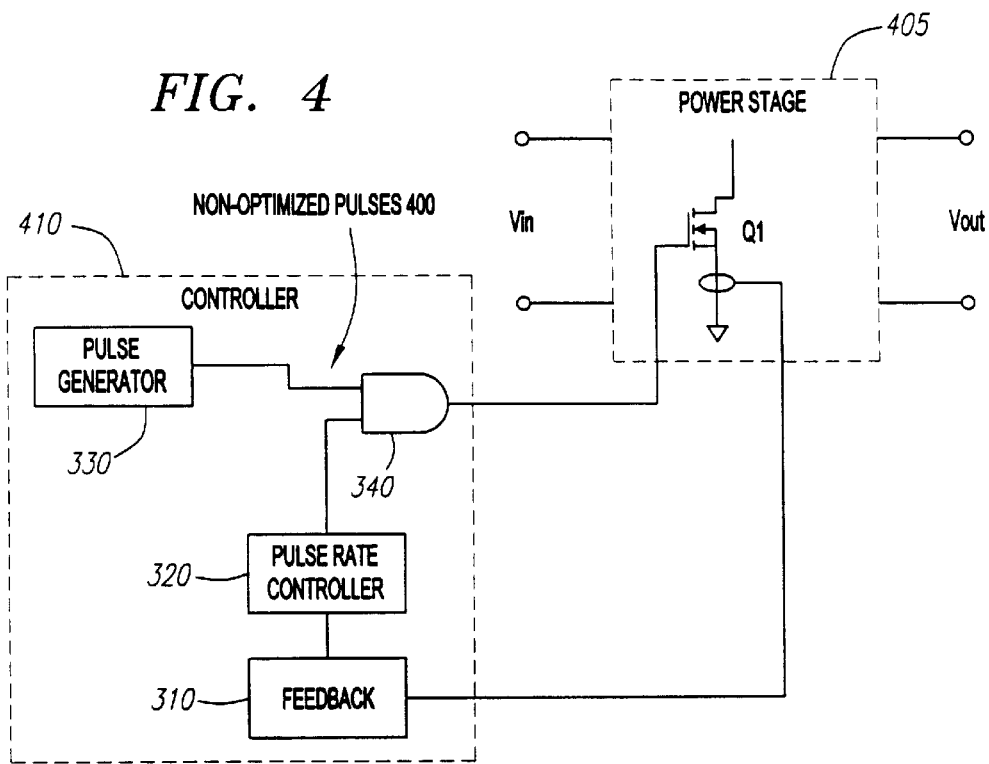
FIG. 4 a schematic illustrating a pulse train control system coupled to a generic power converter (power stage).

Referring to FIG. 4, a more general embodiment of the power train control system is shown in the schematic which illustrates the pulse train control system coupled to a generic power converter (power stage). In this case, the pulse train control system may include a controller 410 that is coupled to a power converter power stage 405. The power stage may include any topology power converter. The controller is coupled to a power switch Q1 at the output of gate 340. Note that the power switch may be integral to the controller or the power stage, separate, or included in a fully integrated power converter and control system. The feedback system 310 of the controller 410 is also coupled to the grounded output of the power switch Q1. In this case, the feedback sense line is coupled as a current sense. However, the current sense may be provided by sensing the voltage across a small value resistance between the output terminal of the power switch (e.g., the source of MOSFET Q1) and a common reference or ground. Once again, the pulse rate controller 320, with feedback 310 input, and the pulse generator 330, are coupled to gate 340.

The pulse train control system illustrated in FIG. 4 operates with a gate in the same way as the pulse train control system described in FIG. 3. The pulse train control system thus controls the output power level of the power converter by varying the number of pulses from the pulse generator 330 that will actuate the power switch Q1. As indicated, the output of pulse generator 330 is non-optimized pulses 400. There is no control for pulse width variation in the pulses of the pulse train. Thus, unlike the PWM control technique, power pulse duty cycle and frequency as generated by the pulse generator 330 of the pulse train control system are uncoupled from the output power level conditions and are instead gated to maintain a desired output power level (e.g., voltage, current, etc.).

A more detailed description of various embodiments of the pulse train control system and its operation may be found in the above-incorporated U.S. patent application Ser. No. 09/585,928.

Figure 5:
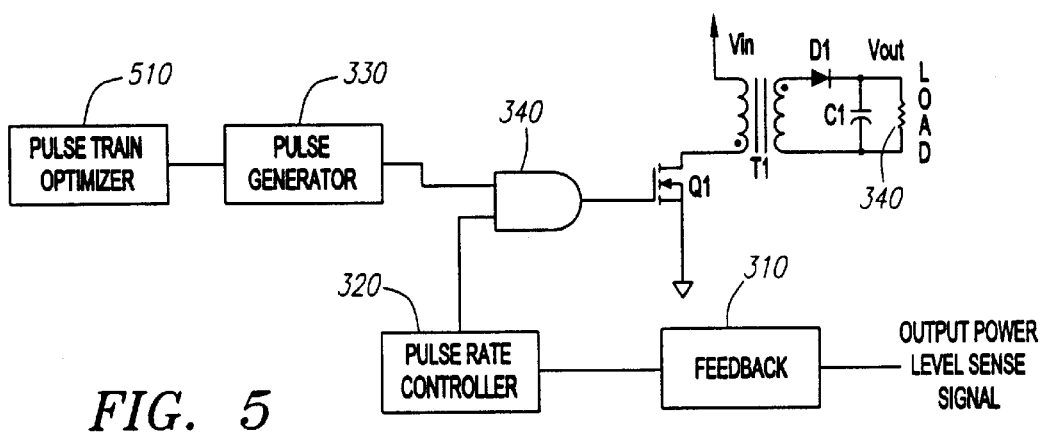
FIG. 5 is a schematic illustrating the general control system including pulse train regulation and pulse train optimization coupled to a flyback power converter, according to one embodiment of the present invention.

Pulse train optimization is a simple, but enabling control technique that adjusts, for example, the turn on time, and/or frequency of the pulses in the pulse train to optimize the performance of the power converter. This control technique is particularly powerful when combined with the pulse train regulation control technique. The combination of these two control techniques can be understood in general using the schematic representations provided in FIGS. 5 and 6. FIG. 5 is a schematic illustrating the general control system including pulse train regulation and pulse train optimization coupled to a flyback power converter.

In this embodiment, the control system includes a pulse optimizer 510 coupled to a pulse generator 330. The optimizer 510 will adjust various parameters and/or characteristics of the pulses output from a pulse generator 330 so as to produce optimized pulses 515. The optimizer 510 may be a combination of analog and digital circuitry and may include logic circuits, memory circuits, registers, and/or a processor needed to achieve the features/functions desired for adjusting the pulse outputs of the pulse generator 330. The processor may be, for example, a microprocessor. Further, the optimizer may include software or firmware for achieving the desired features/functions. Although the pulse optimizer is shown in FIG. 5 as an input to the pulse generator 330, it may be configured so that the pulse generator 330 is an input to the pulse optimizer or has an input to the pulse optimizer 510, as long as the pulse optimizer operates to adjust the pulses in the pulse train as desired.

The control system including, in this case, pulse train regulation and pulse train optimization, is coupled to the power transistor Q1 and flyback power converter. The flyback power converter includes a transformer T1 primary winding coupled to a power source Vin and the power transistor Q1 and a transformer T1 secondary winding coupled to diode D1, capacitor C1, and load 350.

In operation, the pulse optimizer 510 will monitor (not shown) various aspects of the power converter operation, for example input signals and/or output signals, and/or signals on the power transistor Q1, and the parameters and/or characteristics of the pulses to achieve optimum power converter operation. Although the power switch Q1 is illustrated as a MOSFET, it may be any type of power switch including, for example, a bipolar power transistor. The power converter signals and related signals that are to be monitored by the pulse optimizer 510 depends on the feature/function to be optimized and the parameters to be adjusted of the pulses in the pulse train. One or more of the monitoring signals may come from the feedback device 310 that receives an output power level sense signal as one of its input. The pulse optimizer then processes the monitored signals and modifies, processes the results, and adjusts the pulses of the pulse train according to the desired feature functions, for example, quasi-resonant mode operation, discontinuous mode operation, power factor correction, etc.

Therefore, in pulse train pulses from the pulse generator 330 may be preconditioned by the pulse optimizer 510 in order to achieve optimum power supply performance, while the pulse rate controller 320 maintains output regulation by controlling which of the preconditioned pulses of the pulse train are sent to the power transistor Q1 to switch the power converter.

Figure 6:
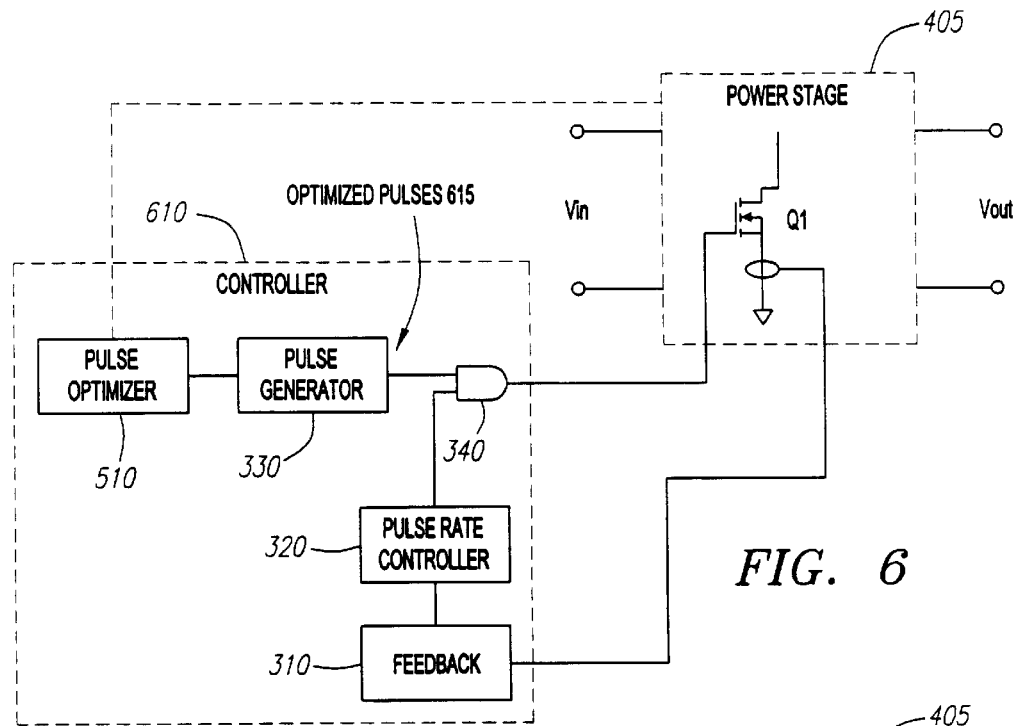
FIG. 6 is a schematic illustrating the general control system including pulse train regulation and pulse train optimization coupled to a generic power converter (power stage), according to another embodiment of the present invention.

Referring to FIG. 6, provides a schematic of another embodiment with the control system including pulse train regulation and pulse train optimization and coupled to a block representation of a power converter (designated as a power stage). In this case, the power converter of the power stage 405 may be of any topology. The pulse optimizer 510, the pulse generator 330, the gate 340, the pulse rate controller 320, and the feedback 310 are included in controller 610. In various variations, the control system may be comprised of separate controllers and/or include the power switch Q1. The operation of this control system is similar to the control system illustrated in FIG. 5 described above. Once again, the output pulses of the pulse generator 330 is modified by the pulse optimizer 510 to produce optimized pulses 615. The optimized pulses are gated to the power switch Q1 by AND gate 340, based on the output signal of the pulse rate controller 320. In this particular embodiment, the feedback signal line 415 is coupled to the output of the power switch Q1 and is illustrated as a current sense.

However, it may be a voltage sense and/or may also include a second sense line connected to Vout. In any case, the pulse optimizer 510 adjusts the characteristics of the pulses output from a pulse generator 330. As such, pulse train pulses from the pulse generator 330 may be preconditioned to achieve optimum power supply performance, while the pulse rate controller 320 maintains output regulation by controlling which of the preconditioned pulses from the pulse train are sent to the power stage 405.

In a variation of the control system shown in FIG. 6, an input sense signal line 620 may be added which couples the pulse optimizer 620 to the power stage 405. The power converter and control system may include a power switch Q1 actuated by the output of a gate 340. The gate 340 has one input from the pulse rate controller 320 and another input from a pulse generator 330. The pulse rate controller 320 may be, for example, a pulse width modulator, microprocessor, etc., with a low frequency framing generator or oscillator (e.g., 50 KHz). The pulse rate controller 320 has input from a feedback circuit 310 that is coupled to the power converter and/or the power switch Q1 via sense signal line 415. The sense signal line may be coupled to the power converter output Vout and, if also coupled to the power switch Q1, may be coupled with a summing circuit (not shown). The feedback circuit 310 may be, for example, a comparator or an analog to digital converter (ADC). The pulse generator 330 has an input from a pulse optimizer 510. The pulse generator may be, for example, a high frequency oscillator (e.g., 1 MHz). The pulse optimizer 510 may have an sense signal input 620 (as indicated by the dashed line) coupled to, for example, the power switch Q1, the input Vin, the output Vout, and/or the power converter.

In operation, the pulse optimizer 510 monitors one or more characteristics and/or parameters of the power converter and/or power switch Q1 so as to adjust or customize the high frequency output pulses in the pulse train output by the pulse generator 330. These adjustments help improve the performance characteristics of the power converter.

The output power level Vout of the power converter is controlled by the pulse rate controller 320 and the feedback circuit 310. The pulse rate controller 320 either enables or disables the various optimized pulses in the pulse train to turn the power switch Q1 ON and OFF, based on the feedback information delivered by the feedback circuit 310 that may monitor, for example, the power converter output power level. Thus, the pulse rate controller 320, feedback circuit 310, gate 340, and pulse generator330 work in conjunction to regulate the power output level Vout of the power converter, and the pulse optimizer 510 in conjunction with the pulse generator 330 regulate other performance characteristics of the power converter, for example, quasi-resonant operation as will be described below in more detail.

Thus, in general, the power converter and control system includes a switching power stage 405 coupled to, or including, a power switch(es) (e.g., MOSFET Q1) wherein an ON and OFF cycle of the power switch Q1 produces a pulse of power at an output of the switching power supply. The control system (e.g., controller 610) controls the ON and OFF cycle of the power switch and may include: (1) a pulse rate controller 320 that provides output level regulation of the power converter by controlling the rate of pulses sent to the power switch Q1 over time; (2) a pulse generator 330 which produces a continuous stream of power pulses, (3) a gate, for example an AND gate 340, that gates pulses from the pulse generator 330 to the power switch Q1, based on input from the pulse rate controller 320, and (4) a pulse optimizer 510 which controls the characteristics of the power pulses output by the pulse generator 510, resulting in optimized operation. This power converter control system may be, for example, one or more digital controllers. The gate may be, for example, a plurality of logic gates. The power stage 405 may include a power converter of any topology.

Figure 7:
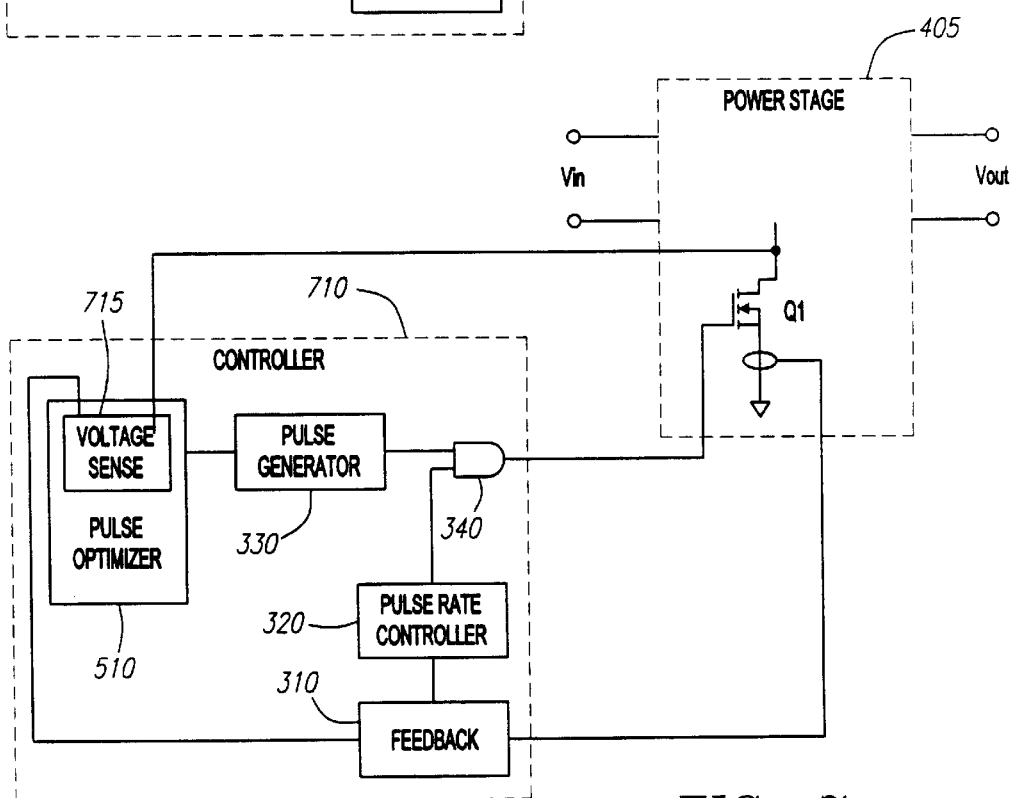
FIG. 7 is a schematic illustrating the general control system including pulse train regulation and pulse train optimization having a voltage sense coupled to a generic power converter (power stage), according to a further embodiment of the present invention.

Referring now to FIG. 7, another more detailed embodiment for a control system including pulse train regulation and pulse train optimization is provided. In this variation the pulse optimizer 510 includes a voltage sense 715. This voltage sense is coupled to the power input terminal of the power switch, for example, the drain of the MOSFET Q1, via sense line 720. Further, the voltage sense 715 may be coupled to the output terminal of the power switch, for example, the source of MOSFET transistor Q1, via sense line 415 and feedback device 310. Of course, the voltage sense 715 and sense line 415 may be couple together without going through feedback 310. The voltage across power switch Q1 may be monitored using input from sense line 720 and sense line 415. This voltage may then be used by the pulse optimizer 510 to adjust various parameters and/or characteristics of the pulses output by pulse generator 330 to achieve particular features/functions. One such feature/function is quasi-resonant operation of the power stage 405.

One example of a control system with pulse train optimization provides quasi-resonant operation. Resonant and quasi-resonant power converter operation improves operational efficiency, system reliability, and reduces EMI emissions of the power converter. The lower the voltage across the power switch at the time it is turned on, the better the performance of the power converter. The lower voltage across the power switch also enables use of a lower the power rated power switch and/or power switch reliability. The closer the switching of the power switch is to the point in time when there is zero volts across the inductor, the more closely quasi-resonant operation will be achieved, and the more benefits that will occur. Operating at or near quasi-resonance will increase operational efficiency by reducing switching losses, reduce EMI emissions by eliminating high voltage/high current switching, and improve the system reliability by reducing component stress (e.g., stress on the power switch). Quasi-resonant operation can be ensured if the power switch is turned on at a zero voltage switching point. Thus, providing a pulse optimizer 510 with sensing capabilities in the controller 710 will enable operation of discontinuous mode and quasi-resonant mode of conversion throughout all input power line (e.g., Vin) and output load (e.g., Vout) conditions.

Zero voltage switching (ZVS) for the power MOSFET switch(es) and for power transformer magnetic flux is a condition when the time to trigger a next power pulse is optimized to be coincident with a zero crossing point of the transformer primary winding. This occurs the ringing MOSFET Q1 drain voltage waveform crosses through the input voltage value, Vin. This mode of operation may thus be known as a quasi-resonant mode. To ensure quasi-resonant mode operation of the power converter, the pulse optimizer 510 may be configured to allow pulses of the pulse train output by the pulse generator 320 to switch the power switch from OFF to ON, only when voltage across the primary winding is approximately equal to zero volts. At this point, the magnetic flux in a transformer (or inductor) is fully reset and the voltage across the primary of the transformer (or inductor) equals zero as well.

Figure 8:
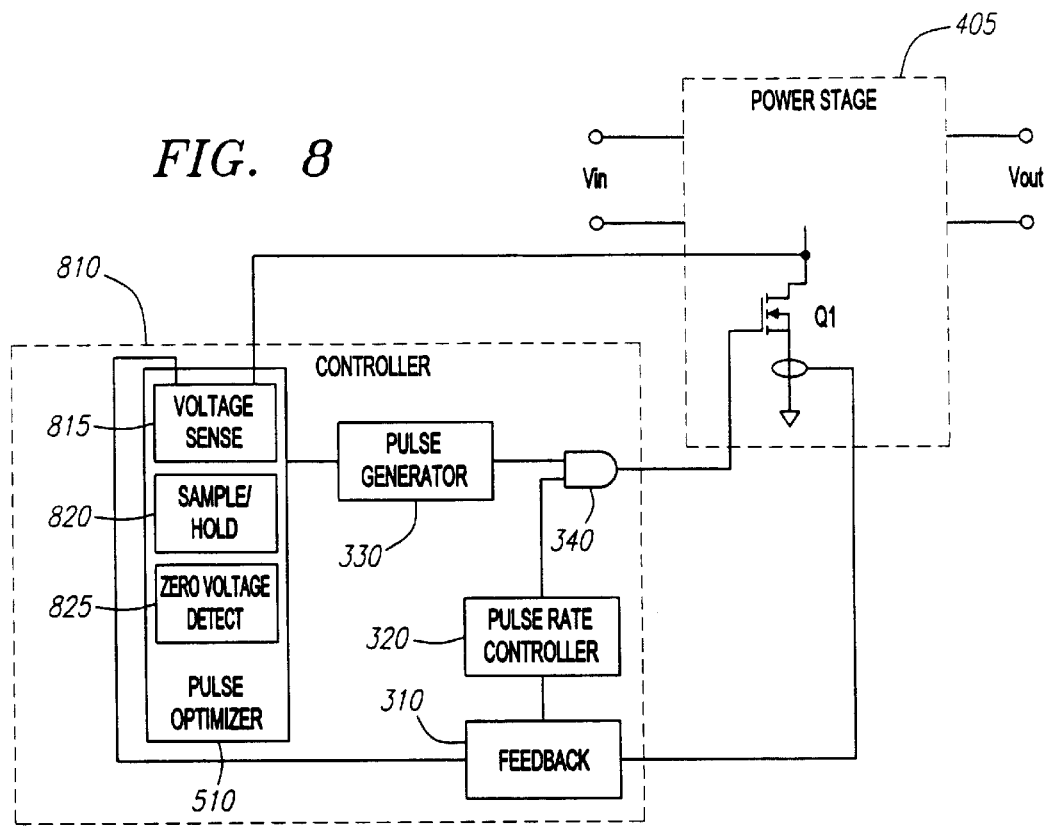
FIG. 8 is a schematic illustrating the general control system including pulse train regulation and pulse train optimization having a voltage sense, sample and hold, and zero voltage detect, coupled to a generic power converter (power stage), according to still another embodiment of the present invention.

In the case of "zero voltage switching" (ZVS), the pulse optimizer is constructed to ensure that the power switch(es) transition from the "off" to "on" state when the voltage across the inductor is approximately equal to zero volts. Referring to FIG. 8, another embodiment capable of ZVS is provided. The schematic of FIG. 8 shows the control system including pulse train regulation and pulse train optimization having a voltage sense 815, sample and hold 820, and zero voltage detect 825, coupled to a generic block indicative of any topology power converter, the power stage 405. In this case, voltage sense 810 may be coupled to the drain of the MOSFET power switch Q1 and the source of MOSFET power switch Q1, for sensing the voltage across the power switch. The sample and hold 820 is coupled to the voltage sense and samples the voltage sensed across the MOSFET power switch Q1. The zero voltage detect 825 is coupled to the sample and hold 820, and dynamically determining when the voltage across the inductor will be at zero volts, and there at sets the turn on time of the pulse(s) in the pulse train output from the pulse generator 330. The pulse optimizer 510 and any of its components (815, 820, and 825) may be implemented using analog and/or digital circuitry and may include various logic circuits and/or a microprocessor for determining and triggering at the optimum time for the next pulse based on a power switch power input (e.g., the drain voltage of a power MOSFET) compared to Vin or Iin.

In operation, the pulse optimizer 510 provides quasi-resonant mode conversion which may be operated at zero voltage switching with the power switch(es) Q1 by continuously sampling of the power switch voltage waveforms.

By sensing the voltage across the power switch with the voltage sense 815, for example sensing the MOSFET Q1 drain to source voltage waveform and Vin from feedback 310, and sampling these voltages with the sample and hold 820, and estimating with an algorithm the zero crossing point of the primary winding voltage waveform with the zero voltage detect 825, the power switch Q1 may be switched to the "on" state when the voltage across the primary winding is approximately or substantially equal to 0 volts. The zero voltage turn on of the power switch Q1 will optimize the operational efficiency by reducing switching losses, reduce EMI emissions by eliminating high voltage/high current switching, and improve the system reliability by reducing component stress. The gate 340 and the pulse rate controller 320 with input from feedback 310 operate as previously described to gate these adjusted or customized pulses to the gate of the MOSFET power switch Q1.

Figure 9:
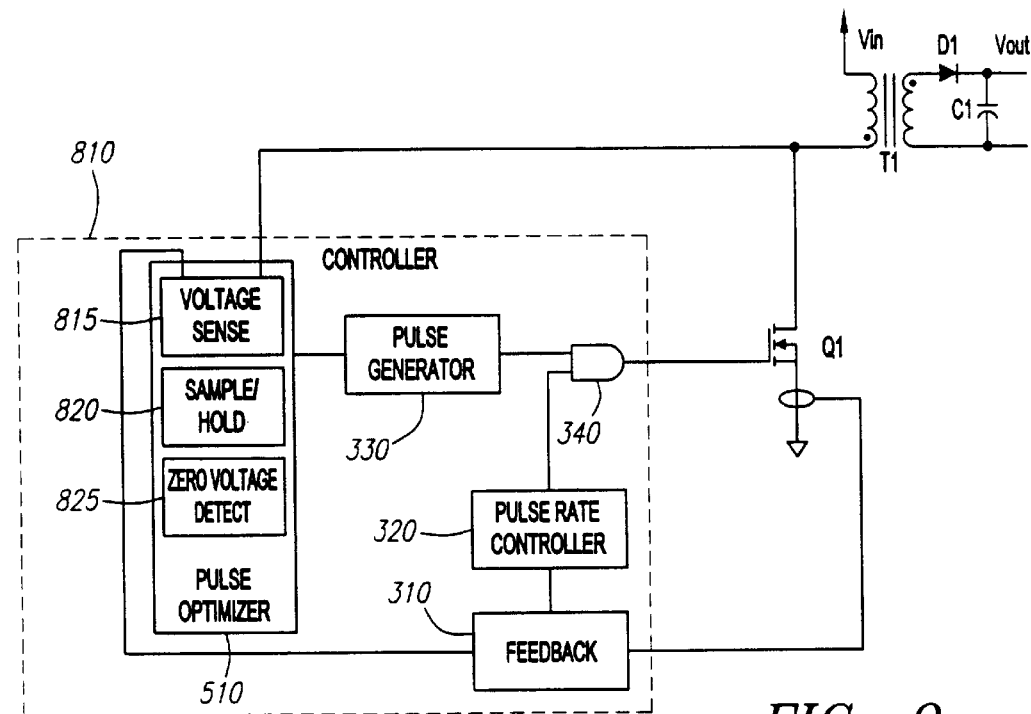
FIG. 9 is a schematic illustrating the general control system including pulse train regulation and a pulse train optimization having a voltage sense, sample and hold, and zero voltage detect, coupled to a flyback power converter (power stage), according to still another embodiment of the present invention.
Figure 10:
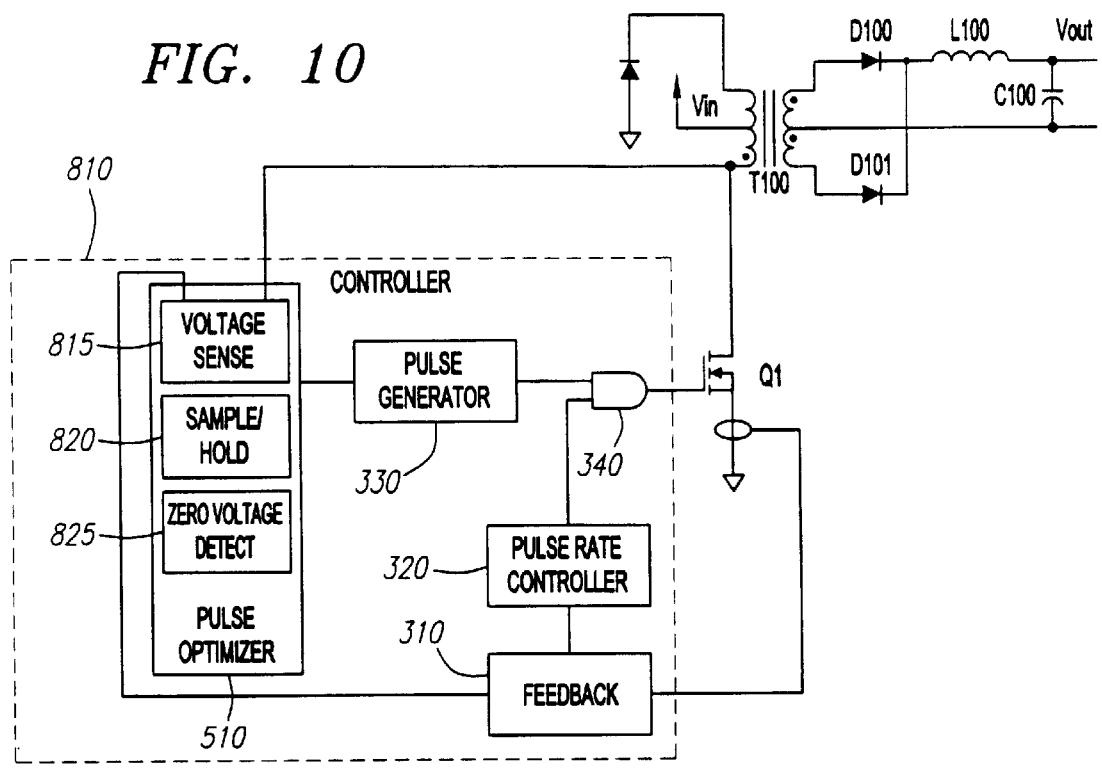
FIG. 10 is a schematic illustrating the general control system including pulse train regulation and pulse train optimization having a voltage sense, sample and hold, and zero voltage detect, coupled to a fly-forward power converter (power stage), according to still another embodiment of the present invention.
Figure 11:
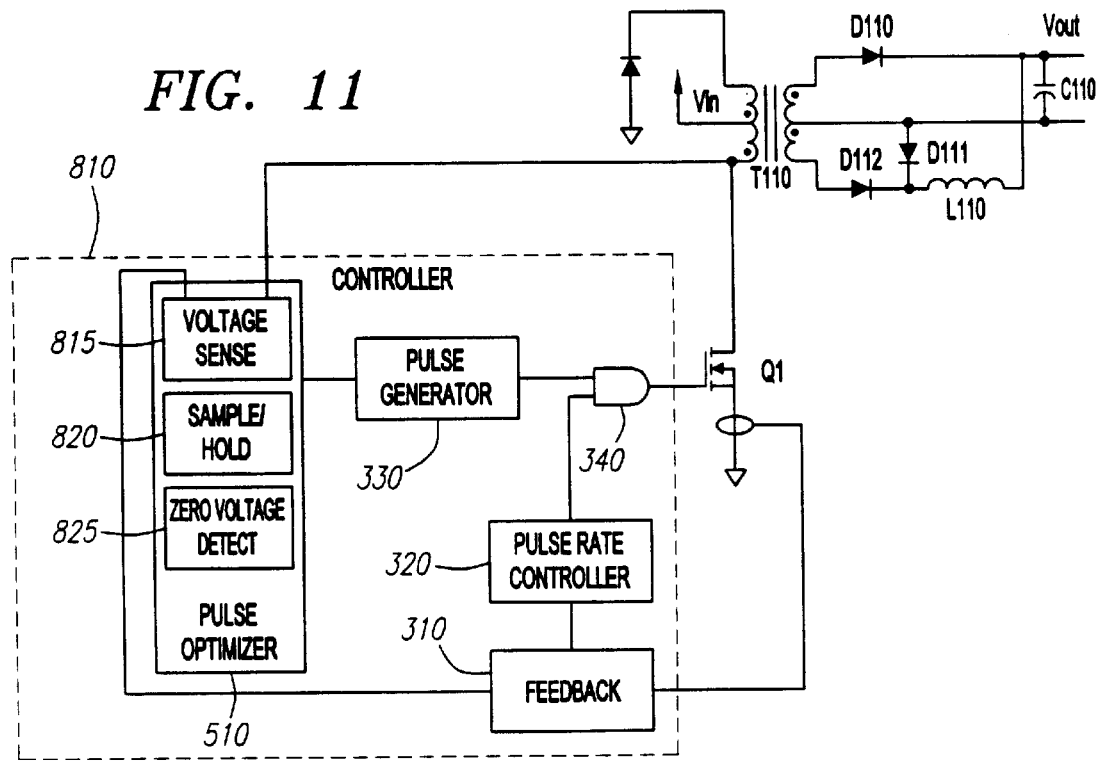
FIG. 11 is a schematic illustrating the general control system including pulse train regulation and a pulse train optimization having a voltage sense, sample and hold, and zero voltage detect, coupled to another type of fly-forward power converter (full forward output stage; power stage), according to still another embodiment of the present invention.

Referring now to FIGS. 9–11, various exemplary embodiments incorporating various aspects of the present invention are provided as they would be implemented with different power converter topologies. The control systems in these embodiments each have a pulse optimizer 510 that may include a voltage sense 815 for sensing the voltage across a power switch Q1, a sample and hold 820 for sampling the voltage across the power switch Q1, and/or a zero voltage detect 825 for determining when the voltage across the primary winding is at zero volts. In each, the pulse optimizer 510 and it components may be implemented using analog and/or digital circuitry and may include various logic circuits and/or a microprocessor(s) for determining and triggering the optimum time for the next pulse based on a power switch Q1 power input (e.g., the drain voltage of a power MOSFET) compared to Vin or Iin. The operation of the control system for each embodiment is similar to that for FIG. 8 and will thus not be described here in detail.

Figure 12:
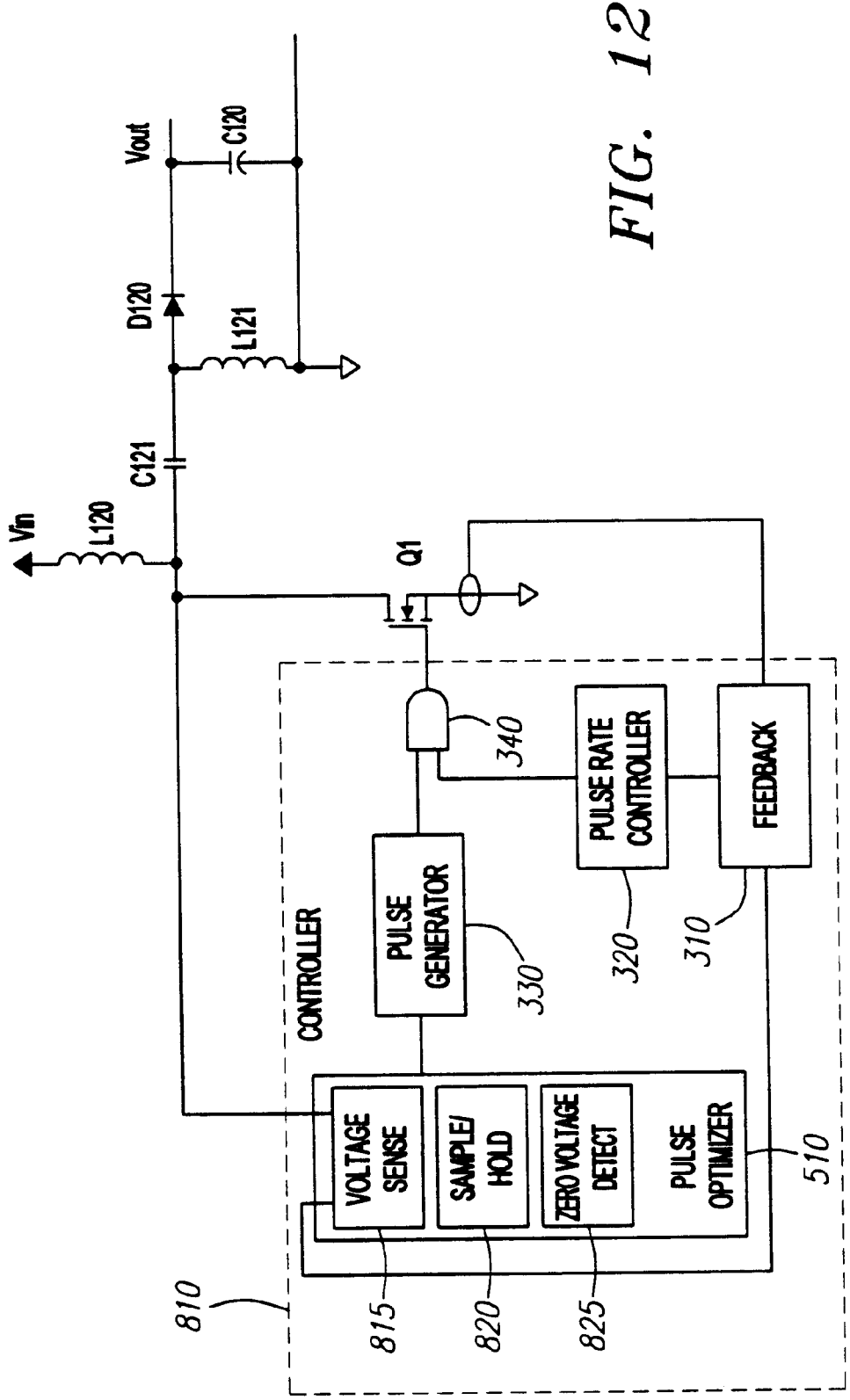
FIG. 12 is a schematic illustrating the general control system including pulse train regulation and pulse train optimization having a voltage sense, sample and hold, and zero voltage detect, coupled to a with a single ended primary inductance converter (SEPIC) power converter (power stage), according to still another embodiment of the present invention.

FIG. 9 illustrates one embodiment for the control system including pulse train regulation and a pulse train optimization, coupled to a flyback power converter. The flyback power converter includes a transformer T1 primary winding coupled to Vin and power switch Q1 and a transformer T1 secondary winding coupled to diode D1 and capacitor C1. FIG. 10 illustrates another preferred control system including pulse train regulation and pulse train optimization coupled to a fly-forward power converter. The fly-forward power converter includes a transformer T100 primary winding coupled to Vin and power switch Q1 and transformer T100 secondary windings coupled to diode D100, diode D101, inductor L100, and capacitor C100. FIG. 11 illustrates still another preferred control system including pulse train regulation and a pulse train optimization coupled to another type of fly-forward power converter (full forward output stage; power stage). The fly-forward power converter of this embodiment includes a transformer T110 primary windings coupled to Vin at a center tap, at one end to diode D115 and at an opposite end to power switch Q1. The transformer T110 secondary windings are coupled to diode D110, diode D111, diode D112, inductor L110, and capacitor C110. FIG. 12 illustrates still another preferred control system including pulse train regulation and pulse train optimization coupled to a with a single ended primary inductance converter (SEPIC) power converter. The SEPIC power converter includes an inductor L120 coupled to Vin and power switch Q1 and a capacitor C121. Capacitor C121 is coupled to diode D120, inductor L121, and capacitor C120.

As will be appreciated by those skilled in the art, the forgoing embodiments are merely illustrative and the control system of the present invention may be used with any power controller topology to achieve optimum operation.

Figure 1:
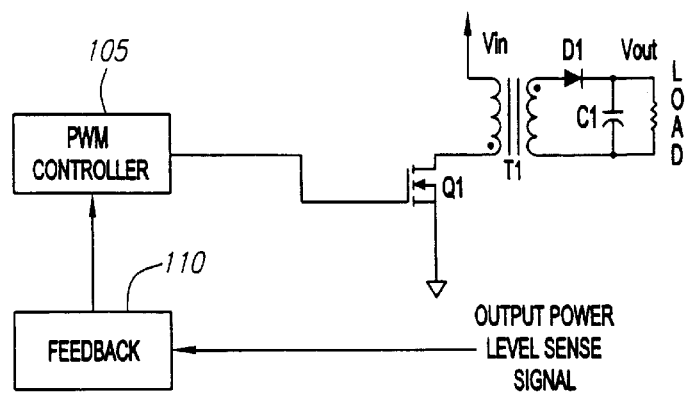
FIG. 1 is a block diagram illustrating a prior art PWM control system coupled to a flyback power converter circuit.
Figure 2:
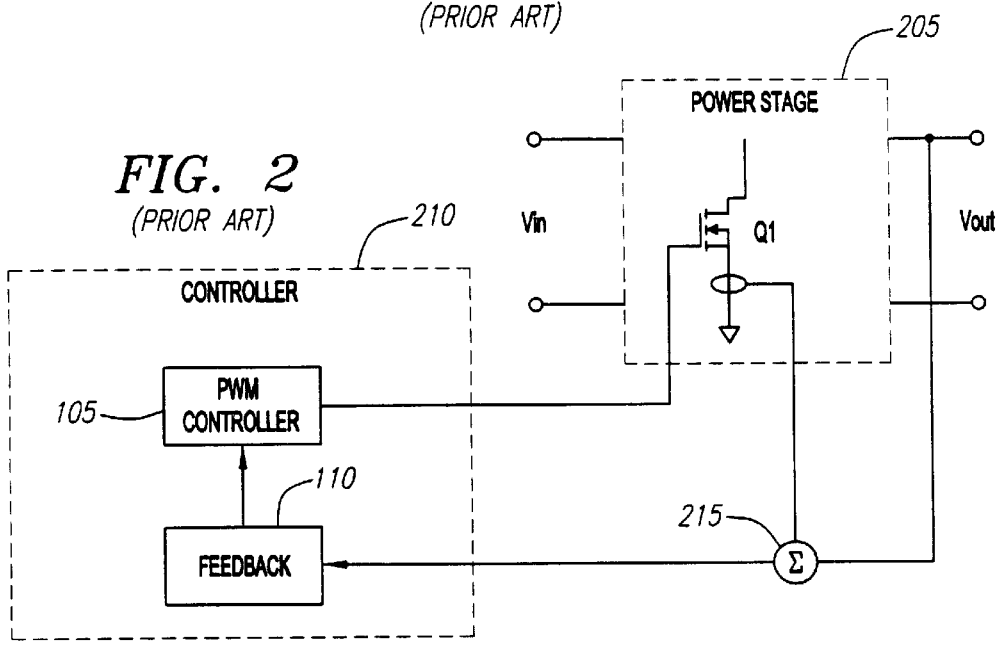
FIG. 2 is a block diagram illustrating a prior art PWM control system for controlling a generic power converter (power stage).
Figure 13:
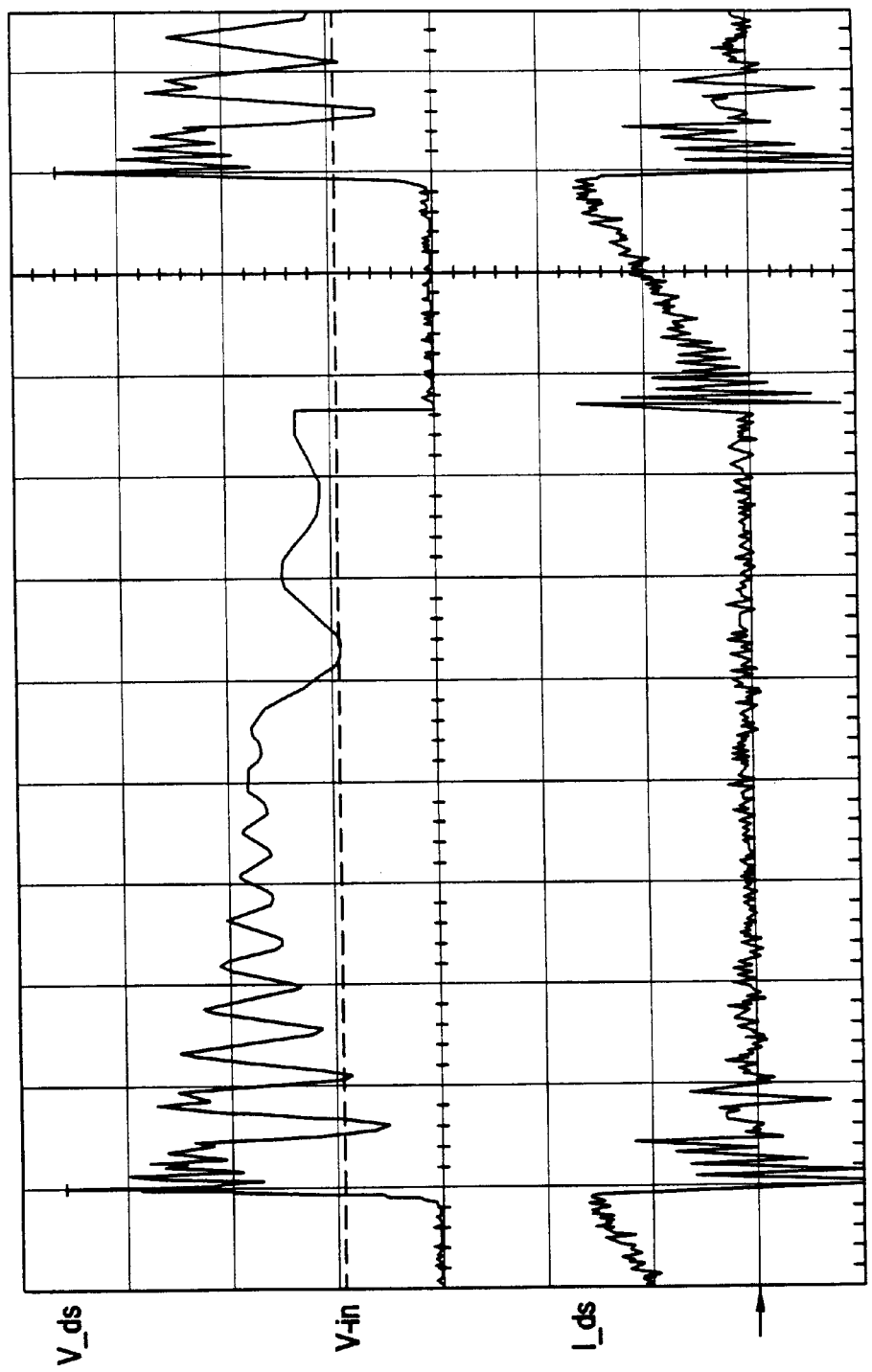
FIG. 13 is a timing diagram illustrating operation of a fly forward converter controller with a pulse train regulator control system similar to the illustration in FIG. 3 with a power stage similar to that illustrated in FIG. 11.
Figure 14:
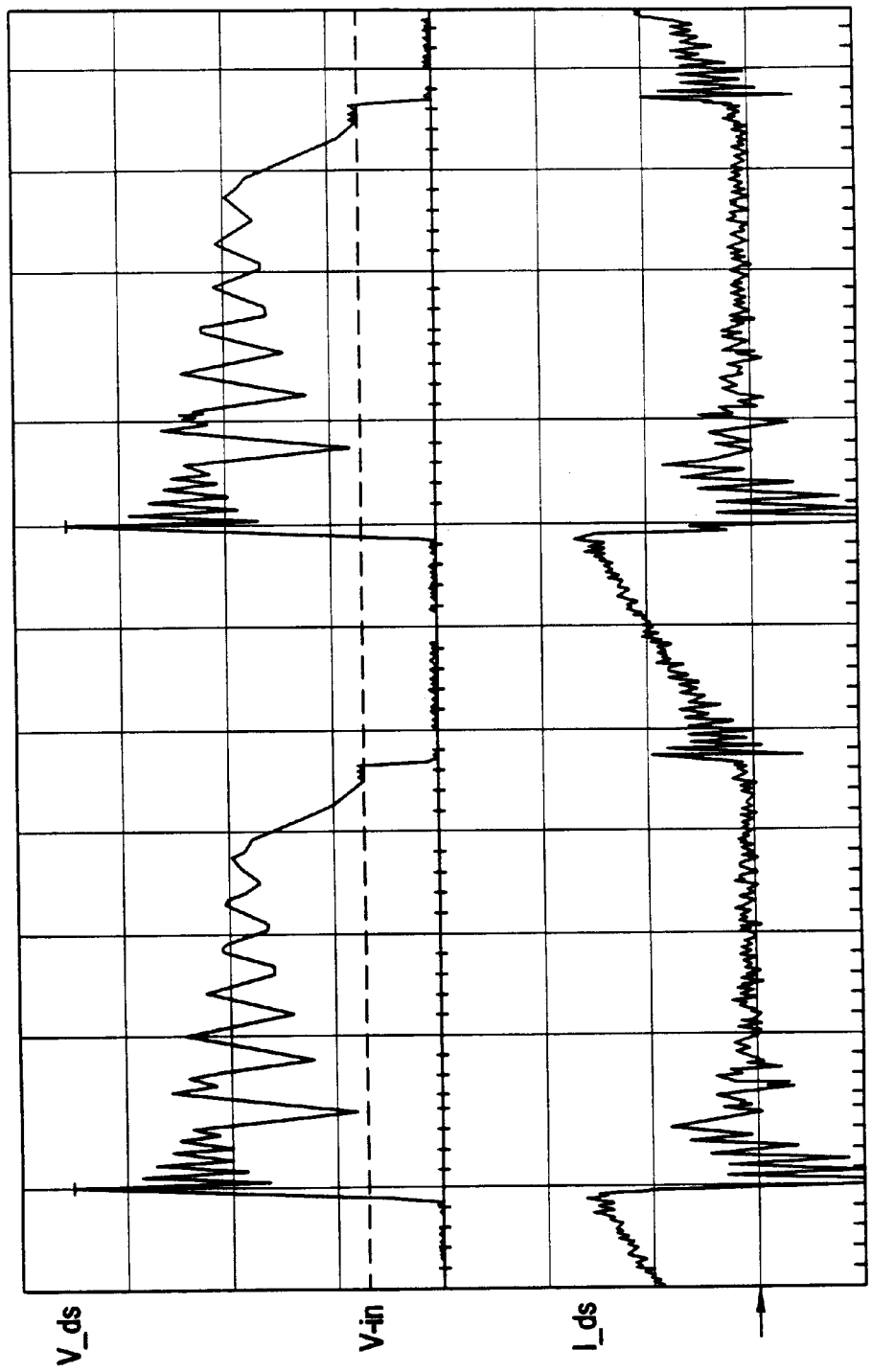
FIG. 14 is a timing diagram illustrating a zero voltage switching control method for the fly forward converter shown in FIG. 11, according to one embodiment of the present invention.

Referring to FIGS. 13 and 14, the operation of a preferred controller is illustrated using a comparison of waveforms depicting the voltage waveform at the drain of the MOSFET power switch Q1 and the current through the MOSFET power switch Q1, for a power converter without and with the pulse optimization control methodology, respectively. FIG. 13 is a timing diagram illustrating the operation of a fly forward converter controller with a pulse train regulation system as illustrated in FIG. 2 and a fly forward power stage as illustrated in FIG. 11. The upper trace illustrates the voltage waveform at the drain of the power switch Q1 without quasi-resonant operation. Notice that just prior to "turn-on" of Q1, the drain voltage is larger than the input voltage, Vin, indicating residual energy stored in the core of the transformer. When Q1 "turns-on" the drain voltage drops sharply to a value near zero volts. The residual energy stored in the transformer core causes a sharp spike in the current through the power transistor Q1.

On the other hand, FIG. 14 is a timing diagram illustrating the operation of a fly forward converter using a zero voltage switching control method according to one embodiment of the present invention, for example, the embodiment shown in FIG. 11. This illustrates the waveform at the drain of the power transistor with quasi-resonant turn-on. The power transistor Q1 is turned on at the first point when the drain voltage is equal to the input voltage Vin, indicating residual energy stored in the core of the transformer is near zero. This reduced residual energy stored in the transformer core reduces the magnitude of the current spike through the power transistor Q1.

There are many benefits that insure to the power converter and control system as a result of using the teachings of the present invention. The high frequency pulse train from the pulse generator 330 provides a means for increasing the overall power converter efficiency by, for example, using the same frequency so that various circuit components (e.g., power transistors, power MOSFET(s), rectifier diode's, transformer's, inductor's, capacitor's, etc.) may be selected to operate with the least amount of loss at the particular frequency and/or frequency range selected for the high frequency pulse train operation. Further, the circuit elements of the power converter may be selected with less exacting electrical characteristics as a result of using the teachings of the present invention.

Although particular embodiments of the present invention have been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the scope of the invention. For example, it is contemplated within the scope of the invention that each component of the control system may be included within one or more of the same controllers and/or microprocessors. Further, it is contemplated by the present invention that the control system will sense the various power stage (i.e., power converter including a power switch) parameters directly or indirectly. One skilled in the art will understand that the control system of the present invention may implemented with analog and/or digital circuitry, which may include various logic circuits and/or a microprocessor along with appropriate software or firmware to achieve the desired feature/functions for optimum power converter operation.

All publications, patents, and patent applications cited herein are hereby incorporated by reference in their entirety for all purposes.

What is claimed is:

1. A power converter control system, comprising:
   a power switch coupled to a power source, the power switch, when cycled ON and OFF, defining a pulse of power at a load;
   a pulse generator coupled to said power switch, said pulse generator producing a pulse signal for cycling said power switch ON and OFF;
   a pulse rate controller coupled between said power switch and said pulse generator, the pulse rate controller regulating an output power level at the load by controlling the rate of pulses from said pulse generator applied to aid power switch over time; and
   a pulse optimizer coupled to said pulse generator, said pulse optimizer adjusting said pulse signal output from said pulse generator to create power pulses that result in switching said power switch in a manner so as to optimize power converter operation dynamics.

2. The control system of claim 1, wherein said pulse optimizer includes a voltage sensing circuit.

3. The control system of claim 2, wherein said pulse optimizer further includes a sample and hold circuit coupled to said voltage sensing circuit.

4. The control system of claim 3, wherein said pulse optimizer further includes a zero voltage detector coupled to at least one of said voltage sensing circuit and said sample and hold circuit.

5. The control system of claim 4, wherein said zero voltage detector determines when a voltage value retained by said sample and hold circuit or sensed by said voltage sensing circuit is indicative of a point sufficiently close to a zero voltage switching point.

6. The control system of claim 1, wherein said power switch is a MOSFET.

7. The control system of claim 6, wherein said voltage sensing circuit senses a voltage at a drain of said power switch.

8. The control system of claim 1, wherein said pulse rate controller comprises one or more logic gates.

9. The control system of claim 1, wherein said pulse rate controller comprises an AND gate.

10. The control system of claim 1, wherein said control system controls the operation of a boost power converter.

11. The control system of claim 1, wherein said control system controls the operation of a buck power converter.

12. The control system of claim 1, wherein said control system controls the operation of a SEPIC power converter.

13. The control system of claim 1, said pulse rate controller receiving a feedback signal comprising a current or voltage from a source of said power switch.

14. The control system of claim 1, wherein said control system controls the operation of a flyback power converter.

15. The control system of claim 1, wherein said control system controls the operation of a transformer-coupled power converter, said transformer comprising a forward biased winding and a flyback biased winding.

16. The control system of claim 1, wherein said control system controls the operation of a full-forward power converter.

17. A control system for controlling a power converter, comprising:
    a pulse generator that generates a pulse train of switch activation pulses for actuating a power switch for delivering corresponding output power pulses to a load, said switch activation pulses pulses having one or more parameters; and
    a pulse optimizer coupled to said pulse generator, said pulse optimizer adjusting at least one parameter of said switch activation pulses in said pulse train so as to control said output power pulses to said load.

18. The control system of claim 17, wherein said switch activation pulse parameters include one or more of pulse ON time, pulse duty cycle, and pulse frequency.

19. The control system of claim 17, wherein said pulse optimizer includes voltage sensing circuitry for sensing a voltage at a drain of said power switch.

20. The control system of claim 19, wherein said pulse optimizer further includes sample and hold circuitry that samples and retains voltage values sensed by said voltage sensing circuitry.

21. The control system of claim 20, wherein said pulse optimizer further includes a zero voltage detector that determines when to activate said power switch when a zero voltage point occurs at said drain of said power switch.

22. The control system of claim 21, wherein said zero voltage detector determines when a voltage value retained by said sample and hold circuitry or sensed by said voltage sensing circuitry is indicative of a point sufficiently close to a zero voltage switching point.

23. A control system for controlling a power converter, comprising:
    a gated oscillator control circuit for generating a pulse train of pulses for activating a power switch for delivering corresponding output power pulses to a load, said switch activation pulses having one or more parameters, said control circuit configured to adjust said one or more pulse parameters so as to control said output power pulses, said parameters selected from a group comprising pulse ON time, pulse duty cycle, and pulse frequency.

24. The control system of claim 23, wherein said parameters are adjusted based on input from a voltage sense that senses the voltage at a drain terminal said power switch.

25. A method for controlling a switching power converter, comprising:
    providing a pulse train of activation pulses for controlling a power switch; and
    adjusting one or more parameters of said switch activation pulses in said pulse train so as to control corresponding output power pulses to a load.

* * * * *